(12) United States Patent
Battles et al.

(10) Patent No.: US 7,530,515 B2
(45) Date of Patent: May 12, 2009

(54) DATA STORAGE TAPE CARTRIDGE AND SYSTEM HAVING A RADIO FREQUENCY WRITE MEDIUM

(75) Inventors: Kevin G. Battles, Wahpeton, ND (US); Michael A. Mewes, Belle Plaine, MN (US)

(73) Assignee: Imation Corp., Oakdale, MN (US)

( * ) Notice: Subject to any disclaimer, the term of this patent is extended or adjusted under 35 U.S.C. 154(b) by 831 days.

(21) Appl. No.: 11/058,842

(22) Filed: Feb. 15, 2005

(65) Prior Publication Data

US 2006/0180694 A1  Aug. 17, 2006

(51) Int. Cl.
*G11B 15/66* (2006.01)

(52) U.S. Cl. .................................. 242/332.4; 242/348

(58) Field of Classification Search .................. 242/348, 242/348.2, 332.4; 360/132
See application file for complete search history.

(56) References Cited

U.S. PATENT DOCUMENTS

| | | | |
|---|---|---|---|
| 5,949,342 A | 9/1999 | Frary et al. | |
| 6,201,662 B1 | 3/2001 | Graves et al. | |
| 6,226,688 B1 | 5/2001 | Frary | |
| 6,266,211 B1 | 7/2001 | Thomas, III et al. | |
| 6,633,454 B1 | 10/2003 | Martin et al. | |
| 6,644,771 B1* | 11/2003 | Silverbrook | 347/19 |
| 6,788,487 B2* | 9/2004 | Unno | 360/72.1 |
| 2003/0002214 A1* | 1/2003 | Kitamura et al. | 360/132 |
| 2004/0047247 A1* | 3/2004 | Johnson et al. | 369/30.36 |
| 2004/0176872 A1* | 9/2004 | Eidemiller | 700/225 |
| 2004/0183743 A1* | 9/2004 | Reasoner et al. | 343/895 |
| 2004/0184801 A1* | 9/2004 | Vraa et al. | 396/517 |
| 2005/0133583 A1* | 6/2005 | Tada | 235/375 |
| 2005/0231583 A1* | 10/2005 | Maghakian | 347/191 |
| 2006/0077585 A1* | 4/2006 | Larson | 360/69 |

* cited by examiner

*Primary Examiner*—William A Rivera
(74) *Attorney, Agent, or Firm*—Eric D. Levinson

(57) ABSTRACT

A data storage tape cartridge is disclosed. The data storage tape cartridge includes a housing, at least one tape reel assembly, a storage tape, and a radio frequency write medium. The housing defines first and second housing sections that are reciprocally mated to form an enclosed region. The tape reel assembly/ies is/are rotatably disposed within the enclosed region, and the storage tape is wound about a hub of the tape reel assembly/ies. The radio frequency write medium is coupled to one of the housing and the tape reel assembly and has cartridge initialization information stored thereon.

20 Claims, 5 Drawing Sheets

DATA STORAGE TAPE CARTRIDGE AND SYSTEM HAVING A RADIO FREQUENCY WRITE MEDIUM

THE FIELD OF THE INVENTION

The present invention generally relates to data storage tape cartridges, and, more particularly, to data storage tape cartridges including a radio frequency write medium configured to store cartridge initialization information.

BACKGROUND OF THE INVENTION

Data storage tape cartridges have been used for decades in computer, audio, and video fields. The data storage tape cartridge continues to be a popular device for recording large volumes of information for subsequent retrieval and use.

A data storage tape cartridge generally includes an outer shell or housing maintaining at least one tape reel assembly and a length of storage tape wound about the tape reel assembly. One common example of a data storage tape cartridge is a single reel data storage tape cartridge having one tape reel assembly rotatably disposed within the cartridge housing. With regard to data storage tape cartridges in general, and single reel data storage tape cartridges in particular, the storage tape is wrapped about a hub portion of the tape reel assembly and is driven through a defined path by a tape drive system. The housing normally includes a separate cover and a separate base that together form an opening (or tape access window) at a forward portion. The data storage tape cartridge is inserted into a tape drive to enable a read/write head of the drive to access to the storage tape to facilitate read/write operations.

With regard to the read/write operations, the interaction between the storage tape and read/write head occurs within the housing for a mid-tape load design. Conversely, the interaction between the storage tape and read/write head occurs exterior to the housing for a single reel design. Where the tape cartridge/drive system is designed to direct the storage tape away from the housing, the data storage tape cartridge normally includes the single tape reel assembly employing a leader block design. Alternately, where the tape cartridge/drive system is designed to provide head/storage tape interaction within the housing, a dual tape reel configuration is typically employed.

Regardless of the number of tape reel assemblies associated with a particular data storage tape cartridge, each cartridge includes at least one strand of magnetic storage tape. In this regard, the magnetic storage tape includes a base substrate (typically a polymeric film, for example, polyethylene naphthalate) coated on at least one side with a magnetic dispersion. The magnetic dispersion, when dry, is sensitive to magnetic fields and is configured to magnetically record information. Immediately after the data storage tape cartridge is manufactured, the magnetic storage tape is blank. In this regard, the "new" cartridge must be initialized, and preferably, the new cartridge is initialized to be compatible with a specific style/make of tape drive employed by a particular end-user/customer.

Generally, conventional data storage tape cartridges are initialized by the cartridge manufacturer. In this regard, the manufacturer is informed by the end-user of the style/make of tape drive(s) that the end-user desires to use in reading/writing to the new cartridges. To this end, the cartridge manufacturer initializes the data storage tape cartridges to be compatible with (i.e., recognized by) the tape drive(s) used by the end-user. As a consequence, the cartridge manufacturer must have knowledge of the various tape drives employed by the various end-users, and then the cartridge manufacturer must correctly initialize the data storage tape cartridges to be compatible with the variety of tape drives employed by the end-users.

With the above in mind, a conventional cartridge initialization process entails that the cartridge manufacturer have on-site at least one of the same style/make of tape drive employed by each of the end-users. The cartridge manufacturer then physically inserts a newly-manufactured data storage tape cartridge into a corresponding one of the manufacturer's tape drives to write the end-user preferred cartridge initialization information onto the storage tape within the cartridge. In this regard, the cartridge initialization write step performed by the manufacturer can take up to 60 seconds for each cartridge. In addition, the cartridge initialization information written to the storage tape is preferably formatted to accord with EMCA 13, a European standard format for cartridge initialization.

Thereafter, the individually initialized cartridges are delivered to the appropriate end-users. The properly initialized cartridges should function in the end-user's tape drive(s). In particular, upon insertion of an initialized cartridge into the end-user's tape drive, the cartridge initialization information is fetched by the tape drive. The tape drive checks for volume information, serial number information, and end-of-tape-mark information ahead of sending this information to the end-user's operating system. To this end, when an initialized cartridge is inserted into an end-user's tape drive, a fetch and delivery procedure is completed, taking approximately one minute.

Initializing newly-manufactured data storage tape cartridges necessitates that the manufacturer purchase and maintain a variety of tape drives. Consequently, initialization of data storage tape cartridges is expensive and time consuming for the cartridge manufacturer. In addition, upon insertion of the initialized cartridge into the end-user's tape drive, a time-consuming information fetch and delivery procedure is conducted. Manufacturers desire an efficient and affordable cartridge initialization process that meets the needs of a variety of end-users. Likewise, end-users have an expectation of receiving data storage tape cartridges that are initialized and compatible with their style/make of tape drives. Therefore, a need exists for an improved data storage tape cartridge and a process for initializing data storage tape cartridges.

SUMMARY OF THE INVENTION

One aspect of the present invention relates to a data storage tape cartridge. The data storage tape cartridge includes a housing, at least one tape reel assembly, a storage tape, and a radio frequency write medium. The housing defines first and second housing sections that are reciprocally mated to form an enclosed region. The tape reel assembly/ies is/are rotatably disposed within the enclosed region, and the storage tape is wound about a hub of the tape reel assembly/ies. In this regard, the radio frequency write medium is coupled to one of the housing and the tape reel assembly and has cartridge initialization information stored thereon.

Another aspect of the present invention relates to a data storage tape cartridge initialization system. The system includes at least one data storage tape cartridge and a radio frequency write device. Each data storage tape cartridge includes a housing forming an enclosed region, at least one tape reel assembly rotatably disposed within the enclosed region, a storage tape wound about a hub of the tape reel assembly, and a radio frequency write medium coupled to one of the housing and the tape reel assembly. In this regard, the radio frequency write device writes cartridge initialization information to the radio frequency write medium.

Yet another aspect of the present invention relates to a method of initializing a data storage tape cartridge. The method includes providing at least one data storage tape cartridge. In this regard, the data storage tape cartridge includes at least one tape reel assembly, a storage tape wound about a hub of the tape reel assembly, and a radio frequency write medium. The method additionally includes writing cartridge initialization information to the radio frequency write medium.

BRIEF DESCRIPTION OF THE DRAWINGS

Embodiments of the invention are better understood with reference to the following drawings. The elements of the drawings are not necessarily to scale relative to each other. Like reference numerals designate corresponding similar parts.

DETAILED DESCRIPTION OF THE PREFERRED EMBODIMENTS

Figure 1:
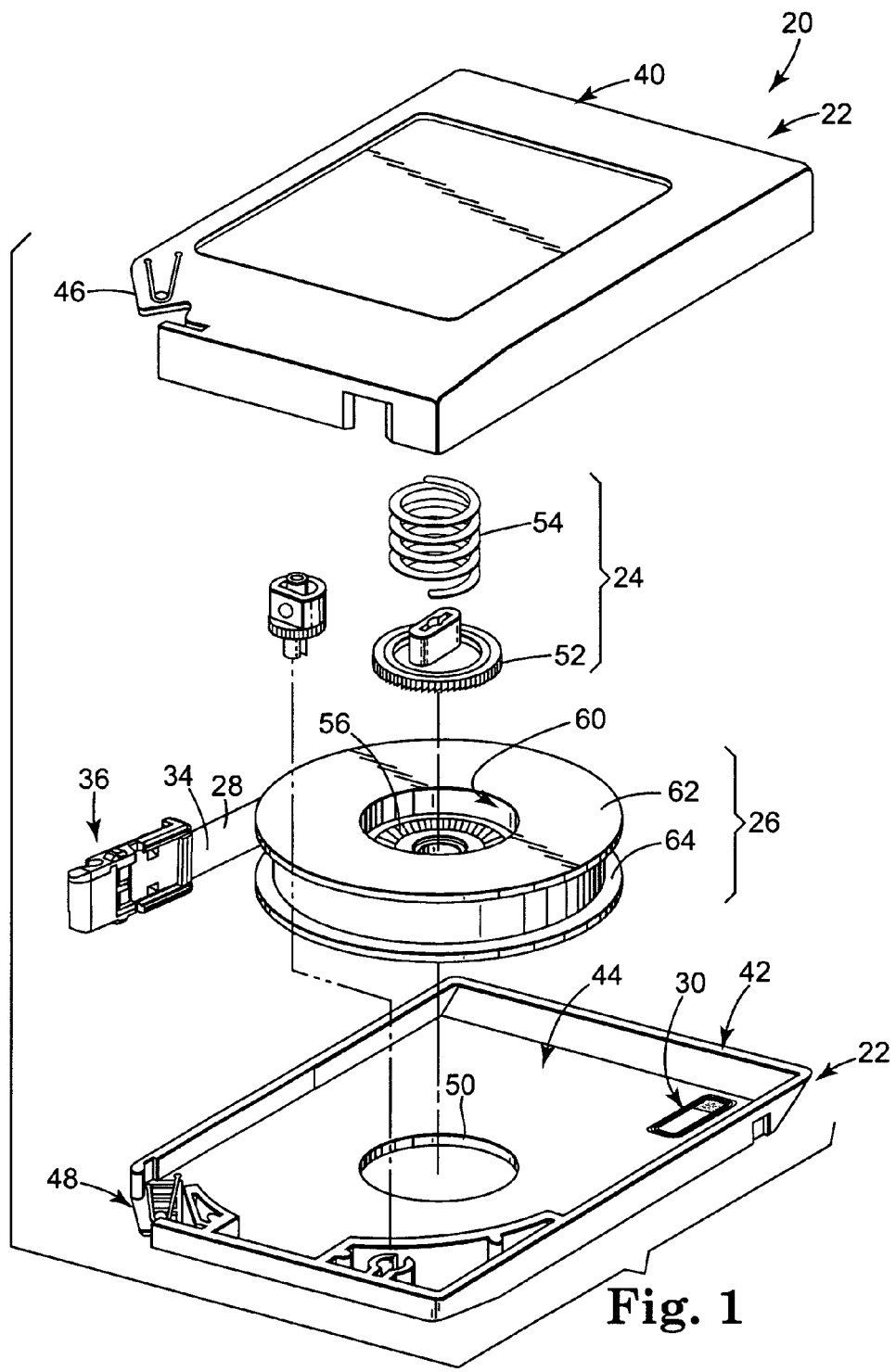
FIG. 1 is a perspective, exploded view of a data storage tape cartridge including a radio frequency write medium according to one embodiment of the invention.

An exemplary data storage tape cartridge according to one embodiment of the present invention is illustrated at 20 in FIG. 1. Generally, the data storage tape cartridge 20 includes a housing 22, a brake assembly 24, a tape reel assembly 26, a storage tape 28, and a radio frequency write medium 30 coupled to the housing 22. The tape reel assembly 26 is disposed within the housing 22. The storage tape 28, in turn, is wound about the tape reel assembly 26 and includes a leading end 34 attached to a leader block 36. As a point of reference, while a single reel data storage tape cartridge is shown, the present invention can be applied to other cartridge configurations.

The housing 22 is sized for insertion into a typical tape drive (not shown). Thus, the housing 22 size is approximately 125 mm×110 mm×21 mm, although other dimensions are equally acceptable. With this in mind, the housing 22 defines a first housing section 40 and a second housing section 42. In one embodiment, the first housing section 40 forms a cover, and the second housing section 42 forms a base. It is to be understood that directional terminology such as "cover," "base," "upper," "lower," "top," "bottom," etc., is employed throughout the Specification to illustrate various examples, and is in no way intended to be limiting.

The first and second housing sections 40 and 42, respectively, are reciprocally mated to one another to form an enclosed region 44 and are generally rectangular, except for one corner 46 that is preferably angled to form a tape access window 48. The tape access window 48 forms an opening for the storage tape 28 to exit the housing 22 when the leader block 36 is removed from the tape access window 48 and threaded to a tape drive system (not shown) for read/write operations. Conversely, when the leader block 36 is stored in the tape access window 48, the tape access window 48 is covered.

In addition to forming a portion of the tape access window 48, the second housing section 42 also forms a central opening 50. The central opening 50 facilitates access to the tape reel assembly 26 by a drive chuck of the tape drive (neither shown). During use, the drive chuck enters the central opening 50 to disengage the brake assembly 24 prior to rotating the tape reel assembly 26 for access to the storage tape 28.

The brake assembly 24 is of a type known in the art and generally includes a brake body 52 and a spring 54 co-axially disposed within the tape reel assembly 26. When the data storage tape cartridge 20 is idle, the brake assembly 24 is engaged with a brake interface 56 to selectively "lock" the tape reel assembly 26 to the housing 22.

The tape reel assembly 26 includes a hub 60, an upper flange 62, and a lower flange 64. The hub 60 defines a tape-winding surface (not visible in FIG. 1 due to the presence of the storage tape 28) about which the storage tape 28 is wound. The flanges 62, 64 are optional. For example, in one embodiment, the storage tape 28 is wound about a flangeless hub such that the tape reel assembly 26 comprises only the flangeless hub. When the flanges 62, 64 are provided, they are coupled to opposing ends of the hub 60 and extend in a radial direction from the hub 60. It is desired that the flanges 62, 64 be spaced a distance apart that is slightly greater than a width of the storage tape 28. In this manner, the flanges 62, 64 are adapted to guide and collate the storage tape 28 as it is wound onto the hub 60.

The storage tape 28 is preferably a magnetic tape of a type commonly known in the art. For example, the storage tape 28 can be a balanced polyethylene naphthalate (PEN) based substrate coated on one side with a layer of magnetic material dispersed within a suitable binder system, and coated on the other side with a conductive material dispersed within a suitable binder system. Acceptable magnetic tape is available, for example, from Imation Corp. of Oakdale, Minn.

The leader block 36 covers the tape access window 48 during storage of the cartridge 20 and facilitates retrieval of the storage tape 28 for read/write operations. In general terms, the leader block 36 is shaped to conform to the window 48 of the housing 22 and to cooperate with the tape drive (not shown) by providing a grasping surface for the tape drive to manipulate in delivering the storage tape 28 to the read/write head. In this regard, the leader block 36 can be replaced by other components, such as a dumb-bell shaped pin. Moreover, the leader block 36, or a similar component, can be eliminated entirely, as is the case with dual reel cartridge designs.

Figure 2:
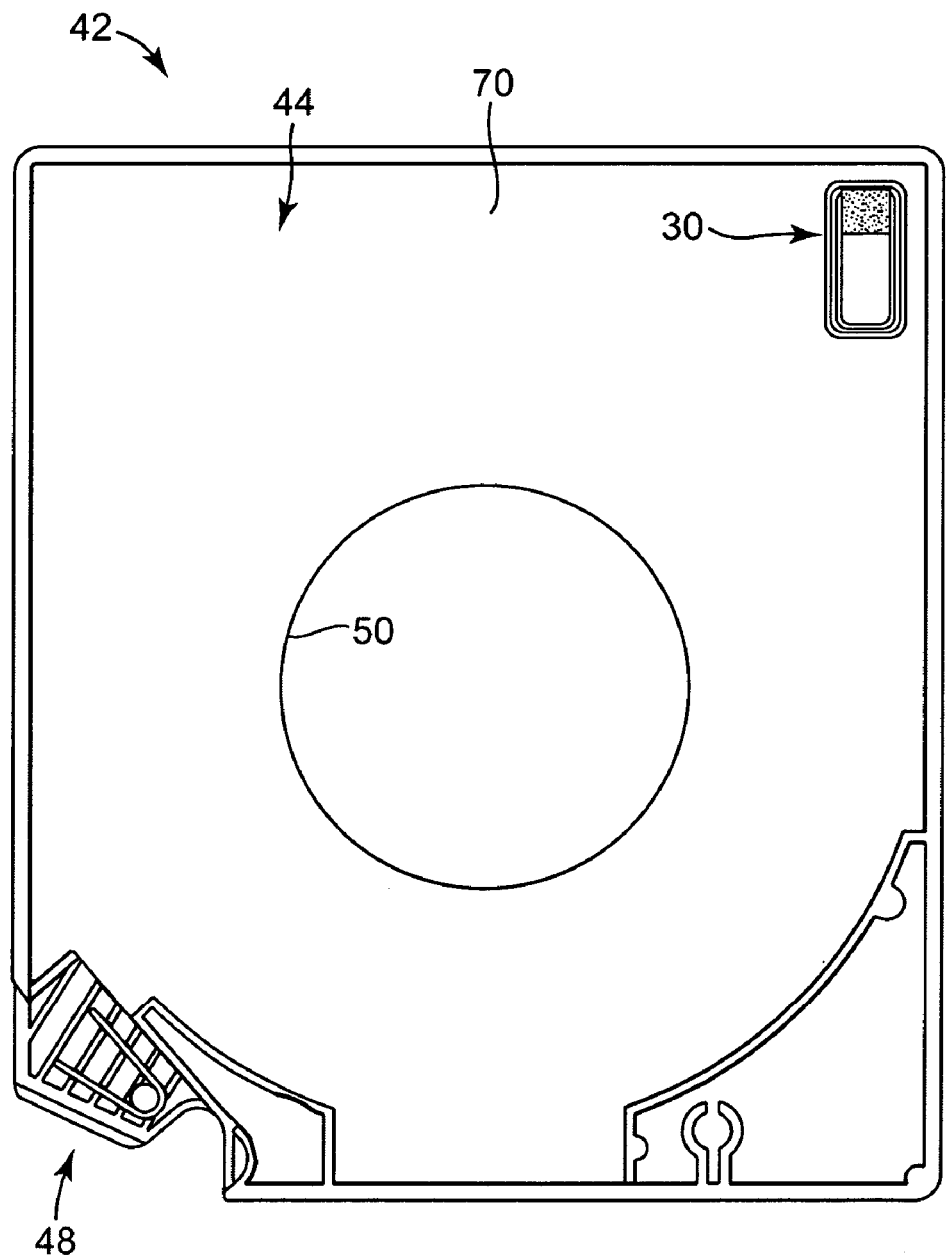
FIG. 2 is a top view of a second housing section of the data storage tape cartridge shown in FIG. 1 where the radio frequency write medium is coupled to an interior surface of the second housing section.

FIG. 2 is a top, plan view of the second housing section 42 showing the radio frequency write medium 30 disposed in the enclosed region 44. In this regard, the tape reel assembly 26 (FIG. 1) has been removed from the housing 22 (FIG. 1) for ease of illustration. In one embodiment, the radio frequency write medium 30 is coupled to an interior surface 70 of the second housing section 42. In this regard, the radio frequency write medium 30 could be coupled to any component of the cartridge 20, including an exterior surface of the housing 22. In one embodiment, a first pocket (not shown) is formed in the first housing section 40 (FIG. 1) and a second reciprocal and opposing pocket (not shown) is formed in the second housing section 42 such that upon assembly of the housing 22 (FIG. 1), the opposing pockets combine to form a cavity within the enclosed region 44 (FIG. 1) that is configured to retain the radio frequency write medium 30. In this regard, the radio frequency write medium 30 is coupled to the housing 22 by being retained within the cavity. In another embodiment, the radio frequency write medium 30 is adhesively attached directly to the interior surface 70 of the second housing section 42.

Figure 3:
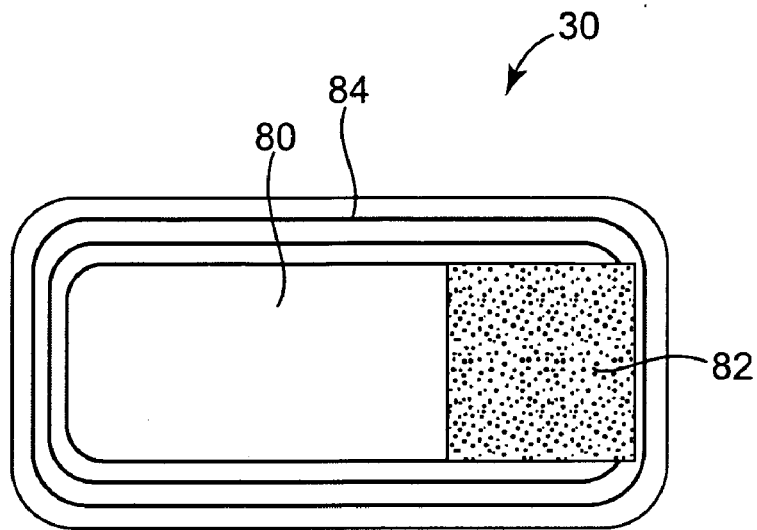
FIG. 3 is a top, plan view of a passive radio frequency write medium according to one embodiment of the present invention.

FIG. 3 is a top, plan view of the radio frequency write medium 30 illustrated in FIG. 2. In a preferred embodiment, the radio frequency write medium 30 is a passive radio frequency identification (RFID) tag and includes a backing 80, a silicon chip 82, and an antenna 84. The backing 80 is a substrate configured to retain the silicon chip 82 and the antenna 84. In this regard, the backing 80 is a carrier for the chip 82 and the antenna 84 components, and in one embodiment is rigid and is referred to as a printed circuit board backing. In an alternate embodiment, the backing 80 is a flexible film backing onto which the chip 82 and the antenna 84 components are laminated to one side prior to adhesively attaching an opposing side of the backing 80 to the interior surface 70 of the enclosed region 44 (FIG. 2). In addition, the backing 80 can include electrical features (such as pads, metal-plating holes, wire bonding, etc.) adapted to facilitate information transfer to/from the chip 82.

The silicon chip 82 electronically records and/or stores cartridge initialization information and is not necessarily drawn to scale in FIG. 3. In one embodiment, the silicon chip 82 is configured to store cartridge initialization information into a plurality of data fields. For example, in one embodiment, the silicon chip 82 is a memory chip capable of recording and/or storing cartridge initialization information including tape mark location, a volume identifier, a serial number, a format identifier, a manufacture name, and/or an SKU number. To this end, the silicon chip 82 is preferably an electronic memory chip having at least the memory capacity to be written with cartridge initialization information. In one embodiment, the silicon chip 82 is an electronic memory chip capable of retaining stored data even in a power "off" condition, and is, for example, a 4 k-byte electrically erasable programmable read-only memory (EEPROM) chip known as an EEPROM chip available from, for example, Philips Semiconductors, Eindhoven, The Netherlands. In another embodiment, the silicon chip 82 is a 1 k-byte electrically erasable programmable read-only memory (EEPROM) chip, although other memory sizes are equally acceptable.

As a point of reference, when the radio frequency write medium 30 is a passive RFID tag, the radio frequency write medium 30 does not employ a power source. In this regard, the passive RFID tag is "powered" whenever access to the tag is initiated by a reader (not shown). For example, when a radio frequency reader queries the RFID tag, an alternating current in the reader's coil (not shown) induces a current in the antenna 84 of the passive RFID tag. This magnetically induced current in the RFID tag enables the tag to send and/or receive data. With this in mind, in one embodiment the radio frequency write medium 30 is a passive RFID tag having a practical read range of less than approximately 15 feet. To this end, in one embodiment the silicon chip 82 is a radio frequency memory chip and includes a radio frequency interface (not shown) to support a near-field, contactless access to/from the memory.

The antenna 84, in one embodiment, is disposed around a perimeter of the radio frequency write medium 30 and is shown as coiled in triplicate in FIG. 3. That is to say, the antenna 84 is a coiled antenna disposed about a periphery of the radio frequency write medium 30. In one embodiment, the antenna 84 is a coiled copper radio frequency (RF) antenna. In an alternate embodiment, the antenna 84 is integrated within the chip 82. In any regard, it is to be understood that other materials for, and various forms of, the antenna 84 are also acceptable. In general, the antenna 84 is configured to inductively couple with a reader (not shown) in receiving/sending data. With this in mind, in one embodiment the antenna 84 is an RF antenna configured to communicate information stored on the chip 82 to an RF reader such that the radio frequency write medium 30 is a transponder module.

Figure 4:
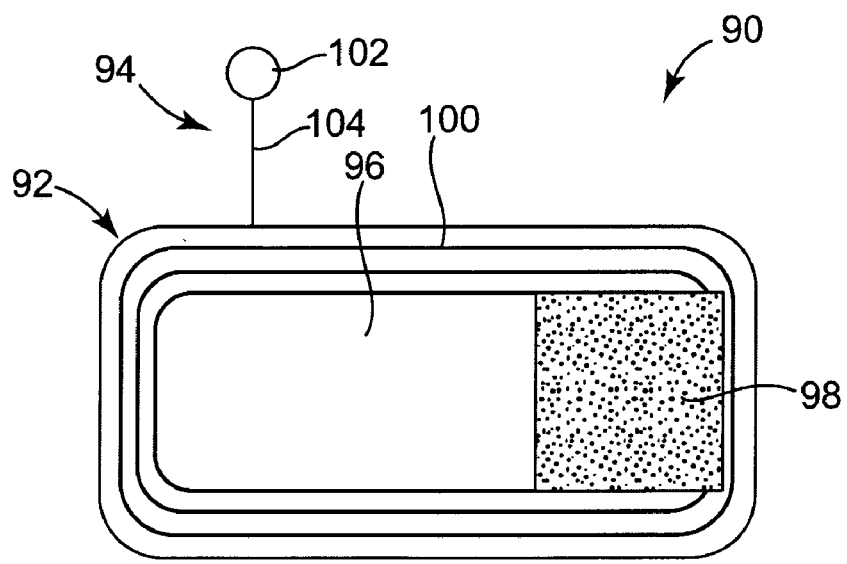
FIG. 4 is a top, plan view of an active radio frequency write medium including a power source according to one embodiment of the present invention.

FIG. 4 is a top, plan view of an active radio frequency write medium 90 according to one embodiment of the present invention. The active radio frequency write medium 90 includes, in one embodiment, an RFID tag 92 and a power source 94. In this regard, the RFID tag 92 is highly similar to the radio frequency write medium 30 shown in FIG. 3. That is to say, the RFID tag 92 includes a backing 96, a silicon chip 98, and an antenna 100, where the backing 96, the chip 98 and the antenna 100 are highly similar to the backing 80, the chip 82, and the antenna 84 shown in FIG. 3. The power source 94 includes a power unit 102 electrically coupled to the RFID tag 92 via an electrical lead 104. In one embodiment, the power unit 102 is a battery, for example, a lithium battery, adapted to power the RFID tag 92. In one embodiment, the power unit 102 is a rechargeable battery adapted to power the RFID tag 92 over its life cycle. In this regard, the rechargeable battery is recharged whenever data is read from the chip 98, or at a specified desired time interval.

The active radio frequency write medium 90 is capable of increased data storage/transmission by virtue of the power source 94. To this end, the chip 98 is configured for greater data storage, and in one embodiment, is an 8 k-byte EEPROM chip available from Philips Semiconductors, and in another embodiment the chip 98 is a 32 k-byte EEPROM chip.

Figure 5:
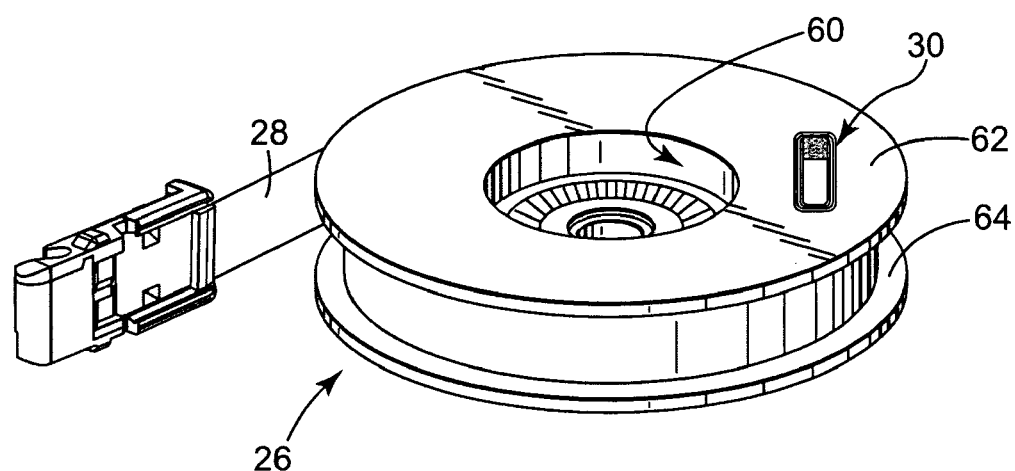
FIG. 5 is a perspective view of a passive radio frequency write medium coupled to a tape reel assembly according to one embodiment of the present invention.

FIG. 5 is an alternate embodiment illustrating the radio frequency write medium 30 (FIG. 3) coupled to the tape reel assembly 26 (FIG. 1) according to one embodiment of the present invention. In this regard, the tape reel assembly 26 includes the storage tape 28 wound about the hub 60, and the storage tape 28 is constrained by the upper flange 62 opposing the lower flange 64. In one embodiment, the radio frequency write medium 30 is coupled to the upper flange 62, as shown. In an alternate embodiment, the radio frequency write medium 30 is coupled to the lower flange 64. In one embodiment, the flanges 62, 64 are optional and not provided and the radio frequency write medium 30 is coupled to the hub 60. In a preferred embodiment, the radio frequency write medium 30 is a passive RFID tag, as described above. However, it should be understood that the radio frequency write medium 30 can, in other embodiments, include an active RFID tag such as the active radio frequency write medium 90, described above. In any regard, when assembled, the radio frequency write medium 30 is coupled to the tape reel assembly 26, disposed within the housing 22, and configured to store cartridge initialization information.

Figure 6:
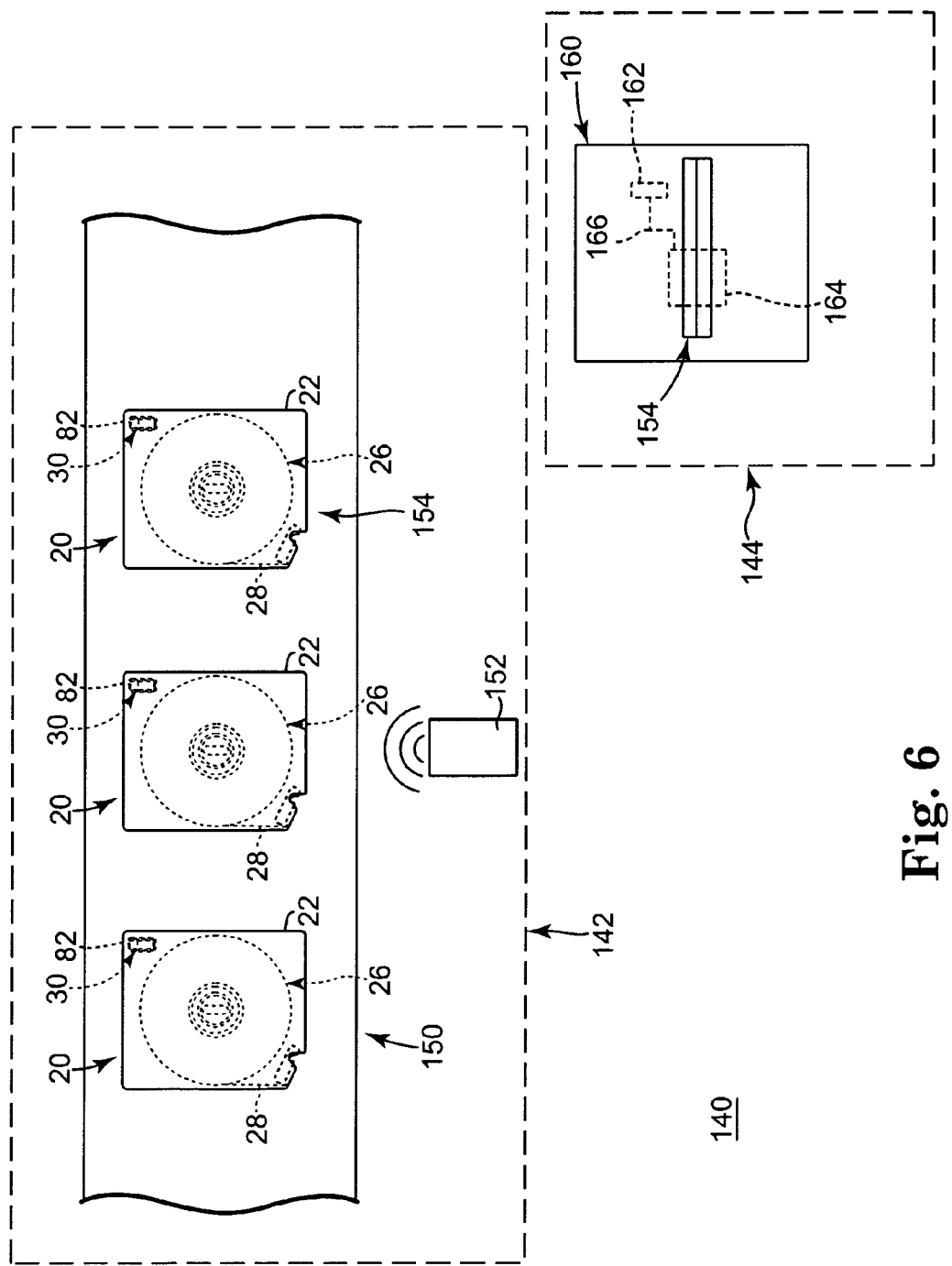
FIG. 6 is a schematic view of a data storage tape cartridge initialization system according to one embodiment of the present invention.

FIG. 6 is a simplified schematic view of a data storage tape cartridge initialization system 140 according to one embodiment of the present invention. The initialization system 140 includes a cartridge initialization write station 142 and a cartridge initialization read station 144.

With regard to the cartridge initialization write station 142, the initialization system 140 includes, in one embodiment, a conveyor system 150 conveying a plurality of data storage tape cartridges 20. In this regard, each of the cartridges 20 includes a radio frequency write medium, for example, the radio frequency write medium 30, as described above. The conveyor system 150 conveys the data storage tape cartridges 20 past a radio frequency write device 152 that is mounted adjacent to the conveyor system 150. Specifically, in one embodiment, a newly-manufactured data storage tape cartridge 20 including the radio frequency write medium 30 is conveyed past the radio frequency write device 152, a signal emanating from the write device 152 and carrying cartridge initialization information is received by the antenna 84 (FIG. 3, not shown in FIG. 6 for ease of illustration), and the cartridge initialization information is stored on the chip 82 for subsequent retrieval. In this manner, after the cartridge initialization information is written to the radio frequency write medium 30, the former newly manufactured data storage tape cartridge 20 is an initialized cartridge 154.

In one embodiment, the radio frequency write medium 30 is a passive RFID tag having a practical read/write range of less than approximately 15 feet. With this in mind, the radio frequency write device 152 is, in one embodiment, an RF read/write device mounted within, for example, 15 feet of the conveyor system 150. In any regard, the write device 152 contactlessly writes cartridge initialization information to the radio frequency write medium 30 in initializing the newly manufactured cartridge 20, such that the cartridge initialization write station 142 produces initialized cartridge 154.

The cartridge initialization read station 144 includes, in one embodiment, a tape drive 160 compatible with and configured to receive the initialized cartridge 154. In this regard, the tape drive 160 includes a radio frequency read device 162 configured to read the cartridge initialization information present on the radio frequency write medium 30 of the initialized cartridge 154. As a point of reference, the cartridge initialization read station 144 is preferably conducted by an end-user in conjunction with a first read/write operation of the initialized cartridge 154. However, other locations for the cartridge initialization read station 144 are possible, and entities other than the end-user can initiate the cartridge initialization read station 144.

Regardless of the entity conducting the cartridge initialization read station 144, in one embodiment, the initialized cartridge 154 is inserted into the tape drive 160 and the cartridge initialization information is read by the radio frequency read device 162 and transferred as digital information to a read/write head 164. In one embodiment, information is transferred between the radio frequency read device 162 and the read/write head 164 via an electrical connection 166. In an alternate embodiment, digitized information is passed contactlessly between the radio frequency read device 162 and the read/write head 164 via radio frequency signal (not shown). In any regard, the radio frequency read device 162 reads the cartridge initialization information from the radio frequency write medium 30 within the initialized cartridge 154, the digitized information is transferred to the read/write head 164 and written to the storage tape 28 within the cartridge 154. To this end, in one embodiment, the radio frequency read device 162 is an RF reader/writer.

Ultimately, it is desired that the cartridge initialization information be written to the storage tape 28. In the conventional cartridge initialization process, the cartridge manufacturer writes the cartridge initialization information directly to the storage tape 28 prior to shipping the cartridge to the end-user. This write step is done for each separate cartridge, and requires approximately 60 seconds. In a later step, upon loading of the cartridge into a tape drive, a read/write head of the tape drive first reads the cartridge initialization information from the storage tape 28 and then transfers this information to the tape drive operating system. This "fetch" step of transferring information to the tape drive operating system is an approximately 60 second step, and must be completed before the cartridge is usable by the tape drive. Thus, the conventional cartridge initialization process is time consuming for both cartridge manufacturer and the end-user.

In contrast, the radio frequency write medium 30 described above frees the cartridge manufacturer from the time-consuming and costly direct writing of the cartridge initialization information to the storage tape 28. In addition, upon insertion of the initialized cartridge 154 into a tape drive, for example, the tape drive 160, the cartridge initialization information can be sent to the tape drive 160 operating system (not shown) contactlessly, and ahead of any other step. In this manner, the cartridge initialization information is "pre-fetched" to the operating system, and represents an immediate timesaving to the end-user. In one embodiment, the read/write head 164 writes the cartridge initialization information to the storage tape 28 as the pre-fetch routine is carried out.

An exemplary data structure as written to the radio frequency write medium 30 according to one embodiment of the present invention is described with reference to Table 1 below. The data structure of the cartridge initialization information written to the radio frequency write medium 30 in one embodiment includes a plurality of data fields. The data fields include, but are not limited to, an initialization cartridge flag field, a plurality of header block flag fields, a plurality of tape mark fields, and one or more header block fields. In one embodiment, the radio frequency write medium 30 allocates memory for the fields. For example, in one embodiment the initialization cartridge flag field, the header block flag fields, and the tape mark fields each have an allocated memory size of less than 4 bytes, and the header block fields have an allocated memory size of approximately 80 bytes. It is to be understood that other allocated memory sizes for the data fields are equally acceptable, and include, for instance, allocated memory sizes in the k-byte range when the radio frequency write medium is an active RFID tag.

With regard to the initialization cartridge flag field, the first time an initialized cartridge 154 is inserted into a tape drive, for example, the tape drive 160 in the cartridge initialization read station 144, the initialization cartridge flag is set to 1 "Yes" to signal to the tape drive 160 that the radio frequency write medium 30 includes cartridge initialization information in one or more header block fields. Recognizing this, the tape drive 160 writes the specified number of header blocks and tape marks to the storage tape 28 as prompted by the header block flag fields and the tape mark fields, respectively. Subsequently, the tape drive 160 retrieves the cartridge initialization information from the header block field(s) and thereafter writes the cartridge initialization information to the storage tape 28. In a preferred embodiment, the cartridge initialization information written to the storage tape 28 is formatted to comply with European Standard EMCA-13. In this manner, the tape drive 160 is prompted by the radio frequency write medium 30 to write the cartridge initialization information to the storage tape 28.

In one embodiment, after the tape drive 160 writes the cartridge initialization information to the storage tape 28, the tape drive 160 sets the initialization cartridge flag to zero "No," but does not clear other data fields. During subsequent insertions of the initialized cartridge 154 into the tape drive 160, the tape drive 160 recognizes that the initialization cartridge flag is set to zero "No" signaling that the cartridge initialization information has already been written to the storage tape 28. That is to say, the cartridge 154 is initialized, formatted, and ready for use in the tape drive 160.

TABLE 1

| Field | Memory Size (bytes) | Comments |
|---|---|---|
| Initialization Cartridge Flag | <4 | 0 = No, 1 = Yes |
| Header Block Flag(s) | <4 | 0, 1, 2, . . . n |
| Tape Mark(s) | <4 | 0, 1, 2, . . . n |
| Header Block 1 | ~80 | Formatted According to EMCA-13 |
| Header Block 2 | ~80 | Formatted According to EMCA-13 |
| Header Block 3 | ~80 | Formatted According to EMCA-13 |

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the chemical, mechanical, electro-mechanical, electrical, and computer arts will readily appreciate that the present invention may be implemented in a very wide variety of embodiments. This application is intended to cover any adaptations or variations of the preferred embodiments discussed herein. Therefore, it is intended that this invention be limited only by the claims and the equivalents thereof.

What is claimed is:

1. A data storage tape cartridge comprising:
   a housing defining first and second housing sections reciprocally mated to form an enclosed region;
   at least one tape reel assembly rotatably disposed within the enclosed region;
   a storage tape wound about a hub of the tape reel assembly; and
   a radio frequency write medium coupled to one of the housing and the tape reel assembly;
   wherein the radio frequency write medium is written with cartridge initialization information that is configured to initialize a tape drive to recognize the data storage tape cartridge.

2. The data storage tape cartridge of claim 1, wherein the radio frequency write medium is an RFID tag.

3. The data storage tape cartridge of claim 1, wherein the radio frequency write medium is a passive RFID tag.

4. The data storage tape cartridge of claim 1, wherein the radio frequency write medium is an active RFID tag including a power source.

5. The data storage tape cartridge of claim 1, wherein the radio frequency write medium is coupled to an interior of one of the first and second housing sections.

6. The data storage tape cartridge of claim 1, wherein the radio frequency write medium is coupled to a flange of the tape reel assembly.

7. A data storage tape cartridge initialization system comprising:
   at least one data storage tape cartridge including:
      a housing forming an enclosed region,
      at least one tape reel assembly rotatably disposed within the enclosed region,
      a storage tape wound about a hub of the tape reel assembly,
      a radio frequency write medium coupled to one of the housing and the tape reel assembly; and
   a radio frequency write device;
   wherein the radio frequency write device writes cartridge initialization information to the radio frequency write medium, the cartridge initialization information communicable to a tape drive to initialize the tape drive to recognize the data storage tape cartridge.

8. The data storage tape cartridge initialization system of claim 7, further comprising:
   a conveyor system conveying a plurality of data storage tape cartridges, each of the cartridges including a radio frequency write medium;
   wherein the radio frequency write device is mounted adjacent to the conveyor system.

9. The data storage tape cartridge initialization system of claim 7, wherein the cartridge initialization information is written to a plurality of data fields.

10. The data storage tape cartridge initialization system of claim 9, wherein the plurality of data fields includes an initialization cartridge flag field having an allocated memory size of less than 4 bytes.

11. The data storage tape cartridge initialization system of claim 9, wherein the plurality of data fields includes at least one header block field having an allocated memory size of approximately 80 bytes.

12. The data storage tape cartridge initialization system of claim 7, wherein the cartridge initialization information includes at least one of an initialization flag, a header block a tape mark location, a volume identifier, a serial number, a format identifier, a manufacturer name, and an SKU number.

13. The data storage tape cartridge initialization system of claim 7, wherein the radio frequency write device writes ECMA-13 Standard compliant cartridge initialization information to the radio frequency write medium.

14. The data storage tape cartridge initialization system of claim 7,
   wherein the tape drive includes a radio frequency read device configured to read the cartridge initialization information from the radio frequency write medium.

15. The data storage tape cartridge initialization system of claim 14, wherein the tape drive includes a read/write head configured to write the cartridge initialization information to the storage tape.

16. The data storage tape cartridge initialization system of claim 14, wherein the radio frequency write device is a first UP reader/writer, the radio frequency write medium is an RFID tag, and the radio frequency read device is a second separate RF reader/writer.

17. A method of initializing a data storage tape cartridge comprising:
   providing at least one data storage tape cartridge including:
      at least one tape reel assembly,
      a storage tape wound about a hub of the tape reel assembly,
      a radio frequency write medium;
   writing cartridge initialization information to the radio frequency write medium; and
   initializing a tape drive with the cartridge initialization information such that the tape drive is configured to read the storage tape.

18. The method of claim 17, wherein writing cartridge initialization information to the radio frequency write medium includes contactlessly transmitting data from a radio frequency write device to a plurality of data fields on the radio frequency write medium.

19. The method of claim 17, further comprising:
   transferring the cartridge initialization information from the radio frequency write medium to the storage tape.

20. The method of claim 19, wherein transferring the cartridge initialization information to the storage tape includes contactlessly reading the cartridge initialization information from the radio frequency write medium and writing with a read/write head of a tape drive the cartridge initialization information to the storage tape.

* * * * *